United States Patent [19]

Hills et al.

[11] Patent Number: 4,558,454
[45] Date of Patent: Dec. 10, 1985

[54] DIGITAL PARTIAL RESPONSE FILTER

[75] Inventors: Michael T. Hills, Silver Spring, Md.; Raymond L. Heinrich, Great Falls, Va.

[73] Assignee: National Information Utilities Corporation, McLean, Va.

[21] Appl. No.: 483,738

[22] Filed: Apr. 11, 1983

[51] Int. Cl.[4] ...................... H04L 25/34; H04L 25/49
[52] U.S. Cl. ........................................ 375/18; 364/724
[58] Field of Search ............................ 375/16, 18, 60; 364/724; 333/18

[56] References Cited

U.S. PATENT DOCUMENTS

| | | | |
|---|---|---|---|
| Re. 30,182 | 12/1979 | Howson | 325/42 |
| 3,388,330 | 6/1968 | Kretzmer | 325/42 |
| 3,492,578 | 1/1970 | Gerrish et al. | 325/42 |

OTHER PUBLICATIONS

Bennett et al-"On the Characteristics"-IEEE Trans. on Computers C-27, No. 12, Dec. 1978, pp. 1197-2002.

Primary Examiner—Joseph A. Orsino, Jr.
Attorney, Agent, or Firm—Kenyon & Kenyon

[57] ABSTRACT

A digital partial response filter is disclosed. The digital partial response filter has particular application in an FM subcarrier (SCA) digital data transmission system wherein digital data is frequency modulated on an F.M. subcarrier. The partial response digital filter includes a digital memory wherein digitized samples of the partial response channel response to a representative input digital data symbol are stored and digital adding means for cumulatively summing the digitized samples in groups so as to produce the partial response channel response to an input digital data stream.

11 Claims, 4 Drawing Figures

DIGITAL PARTIAL RESPONSE FILTER

BACKGROUND OF THE INVENTION

1. Field of the Invention

The present invention relates to partial response filters, and more particularly to a digital partial response filter which has particular application in an FM-SCA (Subsidiary Communications Authorization) digital data transmission system.

2. Description of the Prior Art

Partial response data transmission systems are known. In the known systems, for example, see U.S. Pat. Nos. 3,388,330 to Kretzmer, 3,492,578 to Gerrish and Re. 30,182 to Howson, binary or multilevel digital data is filtered by analog filtering means so that the transfer function of the entire system comprising transmitter, channel and receiver provides a partial response output in response to each input data symbol. By partial response output is meant that the output signal extends in a controlled way over more than one signalling interval, thus causing controlled intersymbol interference. Partial response filtering allows a doubling of the normally obtained signalling rate or, as is known from the work of Nyquist, the maximum symbol rate attainable over a channel of limited bandwidth, i.e., twice the bandwidth of the channel. Alternatively, partial response filtering allows a reduction in bandwidth, which is significant in view of the bandwidth limitations imposed on F.M. subcarrier use by the FCC. Although intersymbol interference is increased by partial response techniques, the interference is well defined and can be eliminated by known techniques. See, e.g., *Principles of Digital Data Transmission*, by A. P. Clark, 1976, pp. 154–192.

The known partial response filters perform their filtering function in an analog manner. It is more convenient, and more accurate data transmission is possible, if the digital data is processed digitally rather than by analog means, however.

It is therefore an object of the present invention to provide a digital realization of a partial response filter.

It is a further object of the present invention to provide a digital partial response filter which has particular application in an FM-SCA digital data transmission system wherein digital data is transmitted by frequency modulating an F.M. broadcast's station's SCA subcarrier.

It is a yet further object of the present invention to provide a digital partial response filter which allows for adaptation to meet the varying characteristics of different channels.

SUMMARY OF THE INVENTION

These and other objects of the present invention are achieved in a digital partial response filter for forming a digital representation of the partial response channel response to input digital data, wherein the input digital data has a data symbol period, comprising means for storing digitized samples of a substantially partial response channel response to a representative input data symbol and for providing the digitized samples as successive outputs and summing means responsive to the input digital data for summing the successive digitized samples in groups so as to form the digital representation of the partial response channel response to said input digital data for each successive data symbol period.

The digital partial response filter of the present invention provide advantages over prior art analog partial response filters. Greater accuracy can be obtained by the present digital partial response filter than by prior art systems, and the present invention may be easily adapted to varying channel characteristics by varying the digitized samples stored in the means for storing.

BRIEF DESCRIPTION OF THE DRAWINGS

The invention will be described in greater detail in the following detailed description with reference to the drawings, in which.

DETAILED DESCRIPTION

Figure 1:
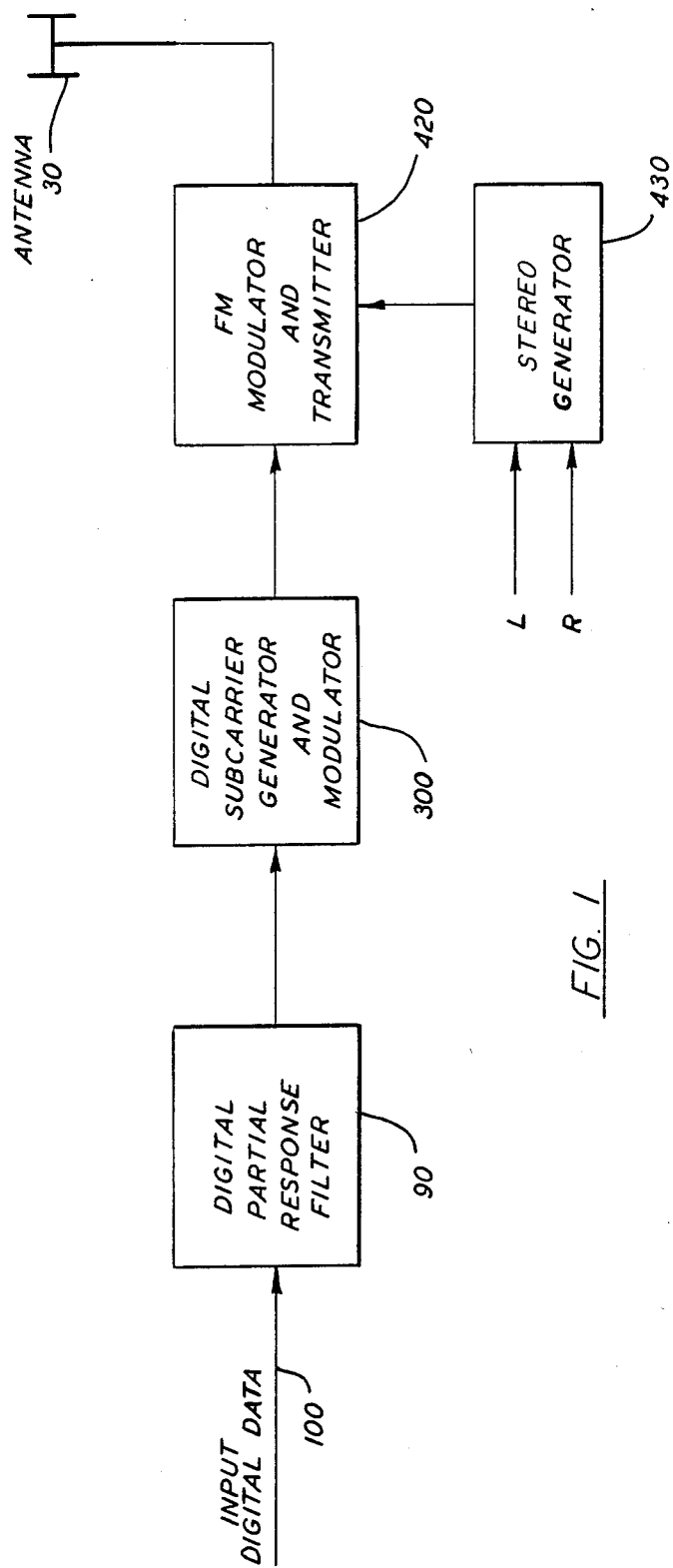
FIG. 1 is a block diagram of the application of the invention to an F.M. subcarrier digital data transmission system.

With reference now to the drawings, FIG. 1 illustrates the basic block diagram of the application of the partial response filter or encoder of the present invention to an FM-SCA digital data transmission system. Received digital data, such as from telephone lines or as relayed via a satellite from sources at greater distances, are fed to the input of the partial response filter 90, preferably in serial form, on line 100. The digital output of the partial response filter is then coupled to the SCA subcarrier generator and modulator 300, which generates the SCA subcarrier and frequency modulates the same with the data from the output of the partial response filter. The SCA subcarrier generator and modulator can also be of conventional analog design, in which case, it must be preceded by a D/A converter stage. Preferably, however a digital type SCA generator and modulator may be used. The output of the subcarrier generator and modulator is fed to the F.M. station's modulator and transmitter 420 along with the composite main channel stereo information from stereo generator 430. The combined signal which modulates the F.M. carrier is then radiated to users via antenna 30. A preferred embodiment of the partial response filter of the present invention employs digital techniques to simulate the spectral effects of a sine spectrum partial response channel, although other known partial response spectrums can be utilized. Samples of the impulse response of a partial response channel corresponding to the linear sum of two sin X/X functions, one of which is inverted and displaced by two signalling intervals, are stored in a memory and read out at the appropriate times so that the partial response channel responses of a defined number of preceding data bits of the input digital data are added to the present bit at any one time. In the preferred embodiment, the responses to 15 preceding digital data bits are summed with the response to the present bit, so that the responses to 16 bits are summed at one time. This provides a reasonable approximation of the partial response output of the input digital data.

Figure 2:
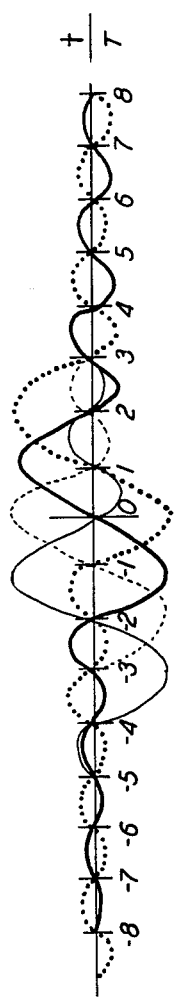
FIG. 2 is a graphical illustration of one type of partial response signals generated in response to input digital data signals and used in a preferred embodiment of the invention.
Figure 3:
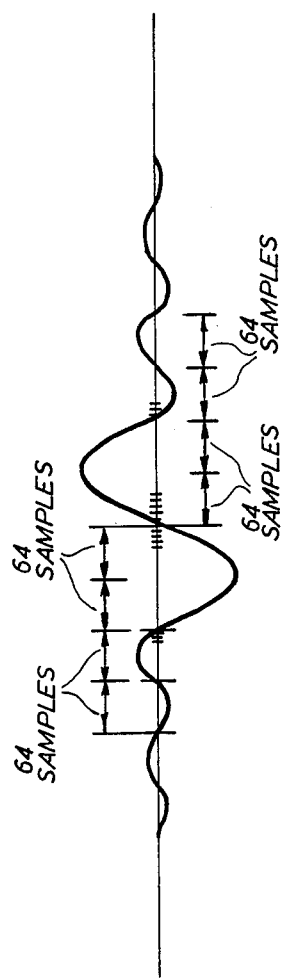
FIG. 3 is a graphical illustration of how one waveform shown in FIG. 2 is sampled and stored in a digital memory.

Referring to FIG. 2, a group of four successive pulses of the form $$\frac{\pi}{4}\left[\frac{\operatorname{Sin}\pi\left(\frac{t}{T}-1\right)}{\pi\left(\frac{t}{T}-1\right)}-\frac{\operatorname{Sin}\pi\left(\frac{t}{T}+1\right)}{\pi\left(\frac{t}{T}+1\right)}\right]$$

are shown, where t=time and T=the symbol time period. The pulse centered at time t=0 is preceded in time by pulses centered at t=−1, −2, −3, etc. and followed in time by pulses centered at t=1, 2, 3, etc. Due to the finite bandwidth of the channel, each pulse does not have sharply defined limits, but rather extends into the time periods occupied by the following pulses as shown by the periodic "tails" of the signal of ever decreasing amplitude. This phenomenon is known as intersymbol interference. In a partial response channel, however, the effects of the intersymbol interference of neighboring pulses can be accounted for by suitable transmitter precoding and receiver threshold-decision-level responsive detecting techniques, for example. Thus, the present invention utilizes a partial response filter which generates a partial response encoded signal from input digital data in order to obtain higher baud rates than heretofore obtainable in narrow band digital data transmission systems such as F.M. SCA digital data transmission systems and yet still remain within F.C.C. bandwidth limitations. The partial response filter described herein forms the composite signal consisting of the partial responses of the present bit in real time and the fifteen previous bits. In order to accomplish this purpose, digital samples of one pulse as shown in FIG. 2 are stored in a digital memory for a time span covering 16 data symbol intervals or periods. Each of the 16 intervals is divided into 64 samples as shown in FIG. 3, through not all 16 intervals are shown therein. This provides an accurate approximation of a sine spectrum partial response channel response to an input digital data symbol.

In order to form the partial response channel response to an input data symbol, the response from 16 data symbols including the one then existing in real time must be summed for each data symbol period. A convenient way to accomplish this is to sum over one data symbol time interval of FIG. 3 all corresponding samples of the same partial response pulse for all 16 time intervals. The response due to data symbols more than 15 data symbol time periods preceding the present data symbol is considered to be too small to be accounted for and is not included in the sum.

Figure 4:
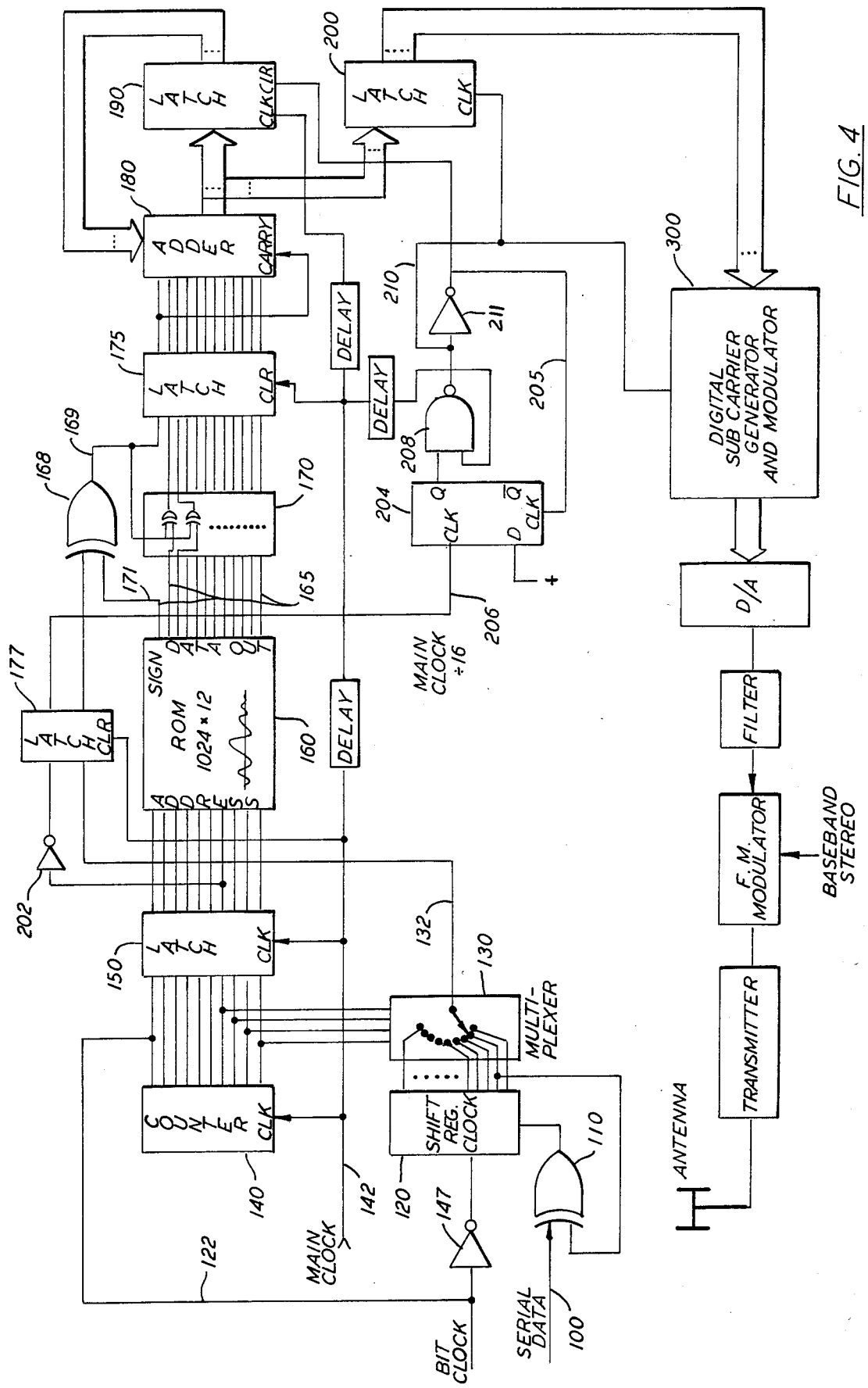
FIG. 4 is a detailed block diagram of the partial response filter of the present invention.

Referring to FIG. 4, a preferred embodiment of the digital partial response filter 90 is shown. Binary serial data to be filtered enters on line 100 at, for example, 9600 baud, into one input of an exclusive OR gate 110. The output of exclusive OR gate 110 is coupled to the input of 16 bit shift register 120. Shift register 120 is clocked by a clock signal on line 122, which signal is inverted by inverter 147. Shift register 120 performs a serial to parallel conversion of the input data, i.e., 16 bits of data are present at the parallel outputs of shift register 120 at any one time. Line 122 is also the bitclock, and thus performs a synchronization function so that the input serial data are present on the input line 100 at the appropriate time for clocking into the shift register. The second least significant bit at the output of shift register 120 is coupled back to the other input of exclusive OR gate 110 and thus the data at the output of gate 110 two clock periods earlier is exclusive OR'ed with the present data bit. As is well known, exclusive OR logic is equivalent to modulo 2 addition, and the combination of exclusive OR gate 110 and shift register 120 performs a pre-coding function well known in the digital communications art for eliminating intersymbol interference in partial response channels. See, e.g., *Principles of Digital Data Transmission*, above, at pp. 168–183, and particularly p. 173, which shows the precoding techniques for a sine spectrum channel.

The parallel outputs of shift register 120 are coupled to multiplexer 130, which sequentially places the parallel data in shift register 120 on line 132 as serial data. Multiplexer control is determined by the 4 low order bits of 10 bit counter 140. The clock signal on line 122 is the high order bit of counter 140, i.e., the 10th bit. Thus, multiplexer 130 will output onto line 132 in succession the 16 bits present in shift register 120 for 64 times. After the 64th time, the shift register will shift its contents one position and a new pre-coded data bit will be accepted from exclusive OR gate 110. Consider 140 is clocked by the main clock on line 142.

The counter 140 count is stored in latch 150 for each clock cycle. Latch 150 addresses memory 160 which may be, for example a Read Only Memory (ROM) as shown in the figure. ROM 160 is organized as a 1024×12 bit memory containing 1024 12 bit samples of the partial response channel impulse response stored in proper sequence as described above with respect to FIGS. 2 and 3. A random access memory or programmable read only memory could also be used in the event that the channel response waveform required modification due to changed channel conditions or in order to provide a different partial response spectrum. Additionally, the digitized samples stored in ROM 160 might be samples of a somewhat different waveform than that described in the equation above if pre-emphasis is added to the signal. For example, the stored waveform might be modified by adding pre-emphasis to the waveform to account for varying channel characteristics. The pre-emphasis can then be de-emphasized by suitable circuitry in the receiver.

The contents of each memory 160 address are present on the 12 data out lines 165. One bit enters exclusive OR gate 168 while the precoded input data enters the other input of exclusive OR gate 168. The remaining 11 bits enter an exclusive OR gate block 170, which exclusive OR's each data line 165 with the output of exclusive OR gate 168 on line 169. The exclusive OR'd outputs are then coupled to latch 175 and thence to 12 bit adder 180. Logic blocks 168, 170, 175 and 180 perform two's complement addition, as will be explained below.

Input data on line 132 is delayed in latch 177 and coupled to one input of exclusive OR gate 168. In this description, various latches and delay elements are described, the purpose of which is to ensure that signals or clock information are present at the proper times in various parts of the circuit. Line 171 from ROM 160 represents the polarity of the value of the stored partial response channel response for any particular sample. A logic 1 on line 171 indicates a positive stored value. The bit value of the data on line 132 is exclusive OR'd with the sign bit. If the data is at a logic 1 and the sign bit is also at a logic 1, a logic 0 appears on line 169, which is exclusive OR'd with each of the other 11 bits in logic block 170. Thus, the output of logic block 170 will be the same as the input if line 169 is a logic 0. If, however, either the sign bit is a logic 0 or the input data is a logic 0, but not both are logic 0, a logic 1 appears on line 169, which is exclusive OR'd with each of the data out lines from ROM 160, thus inverting the data. If both line 132 and line 171 are logic 0, no inversion takes place. The output lines of latch 175 are then fed to adder 180 which adds the new value to the old value accumulated in latch 190.

In two's complement arithmetic, to add a negative value or to subtract a binary number, the inverse of the number to be subtracted is taken and the inverse is added to the other number plus 1. Thus, it is apparent that the logic blocks 168, 170, 175 and 180 accomplish this purpose. When a negative value is to be added, line 169 is a logic 1. Exclusive OR block 170 inverts the data at the input, coupled the data to latch 175 and feeds it to adder 180. Because line 169 is a logic 1 if a negative value is being added, adder 180 adds 1 by virtue of carry input line 182 which is tied to the output line of the latch 175 corresponding to input line 169. Latch 190 accumulates the resultant sum. Thus, when negative values are added to the accumulated sum, exclusive OR block 170 inverts the value stored in ROM 160 and 1 is added to the sum via the carry line 182. When a positive value is to be added to the sum, exclusive OR block 170 does not invert the data from ROM 160 and the binary value is treated as a positive number by adder 182. This operation corresponds to proper addition or subtraction in two's complement arithmetic.

Thus, from the above description, it can be understood that when the input digital data is at a logic 1, and the stored partial response signal corresponding to this data has a positive amplitude at that point in time on the stored partial response waveform, the digitized output of memory 160 is added to the cumulative sum. When the input data is at a logic 0 level and the sign bit is a logic 1, the inverse of the stored digitized quantity is required to be added to the cumulative sum because the stored quantity corresponds to the output which would occur if the input signal was a logic 1 bit. Similarly, if the input data is a logic 1 and the sign bit is a logic 0, inversion of the stored data is also required because the digitized quantity, which is actually stored as a positive quantity, (the sign bit indicates that the actual value stored is a negative number) must be subtracted from the cumulative sum. If both the input digital data and the sign bit are logic 0's, the inverse of a negative number is required to be added to the sum, i.e., a positive number corresponding to the stored positive quantity (in absolute terms), must be added to the cumulative sum.

An alternative way of accomplishing this result might entail storing both positive and negative numbers in memory 160 without a sign bit. The negative numbers could be stored in two's complement form, for instance. In this embodiment, inversion of the stored digitized quantities would only be necessary when the input digital data was a logic 0.

Latch 200 stores the resultant sum and routes it to subcarrier generator and modulator 300, which is preferably a digital SCA generator and modulator. Latch 200 is clocked so that it begins to feed the resultant sum for the present and fifteen prior bits of data information once 16 bits of data have been stored in shift register 120. This is accomplished by clocking latch 200 via clock line 210 as will now be explained.

The fourth order bit of counter 140 which corresponds to a frequency one-sixteenth that of the clock on line 142 is fed from latch 150 through inverter 202 and latch 177. The output of latch 177 is coupled to the clock input of D flip-flop 204. When the fourth order bit of latch 150 goes high, line 206 goes low during the next clock cycle after a delay time due to the inverter 202 and latch 177. This corresponds to the time when the first 8 data bits have been read from shift register 120. After the full 16 bits have been read from shift register 120, a rising edge occurs on the clock input of D flip-flop 204 due to the falling edge of the fourth order counter bit, thus forcing the Q output to a logic 1 because the D input is tied to logic 1. The Q output of flip-flop 204 is tied to an input of NAND gate 208. A delayed main clock signal is coupled to the other input of NAND gate 208. Thus, the output of NAND gate 208 goes to logic 0 when the clock signal on line 206 goes high again. Immediately after the output of NAND gate 208 goes low, however, flip-flop 204 is reset by the inverted signal on line 205 due to inverter 211, thus forcing the output of NAND gate 208 high. The negative pulse thus generated on line 210 also clocks the sum at the output of adder 180 into latch 200. Thus, the sum of 16 samples from ROM 160 are present in latch 200. At the same time, the positive pulse on line 205 clears latch 190 so that the next sixteen samples can be summed.

Another sixteen samples are then read consecutively from the ROM 160 and summed again in dependence on the sign bit on line 171 and the input data in shift register 120, i.e., both the sign bit and the data on line 100, after precoding by gate 110 and shift register 120, control whether the sample from the ROM 160 is added or subtracted from the sum. This sequence is repeated 64 times until the summed partial responses for all 16 bits in shift register 120 have been obtained. At this point the response curve for one data symbol time interval as shown in FIG. 3 has been obtained in 64 digital samples. These 64 samples are available in succession at the output of latch 200.

After counter 140 has cycled to its maximum count, i.e., all output lines of the counter are high, the counter outputs go to logic 0. A falling edge therefore appears on line 122, which is converted to a rising edge by inverter 147. The rising edge clocks shift register 120 by one bit and one new bit enters the shift register. The process again repeats as explained above, with the new bit stream from multiplexer 130 determining how the samples stored in memory are either added or subtracted for the next data symbol time period.

The partial response encoded data is thus available at the output of latch 200 as successive samples of 12 parallel data bits. This data is then fed to subcarrier generator and modulator 300 wherein the subcarrier is generated and the data modulates the subcarrier. If the preferred digital subcarrier generator and modulator is used, as disclosed in the above copending application, a D/A stage converts the output of the subcarrier generator and modulator to analog form, which output is further filtered. After modulation of the subcarrier, the subcarrier is inserted into the baseband FM signal along with the normal stereo composite signal and the combined baseband signal modulates the FM station's carrier for transmission to individual receivers. Only those receivers equipped with special circuitry for receiving and detecting the subcarrier can make use of the subcarrier signal. The subcarrier signal has no objectionable effects on the stereo channels.

The block diagram shown in FIG. 4 represents a simplified diagram of a circuit which could be constructed in accordance with the principles described herein. From this description, one skilled in the art could construct and practice the described invention. Details with which those skilled in the art are readily familiar have not been described at length. For example, certain of the blocks labelled "delay" in FIG. 4 could comprise either latches or gate delay elements. Their purpose is to insure that the clocked logic elements are clocked at the proper times, i.e., so that the proper data is present at the particular input of a logic element when the logic element is clocked. Thus, for example, latch 150 might be addressing a new address in ROM 160 at the same time as adder 180 is adding the contents, of the previous address of ROM 160, as modified by the stages therebetween, to the sum. This is the well known "pipelining" design principle.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A digital partial response filter for forming a digital representation of the partial response channel response to input digital data, said input digital data having a data symbol period, comprising:
    means for storing digitized samples of a substantially partial response channel response to a representative input data symbol for n data symbol time periods, each data symbol time period divided into m samples, where n and m are finite numbers and for providing as outputs, in succession, m groups of n digitized samples, said n digitized samples provided as samples of said partial response channel response at n equally divided data symbol time periods, each successive group having the digitized samples shifted by one sample in said data symbol time period;
    summing means responsive to said input digital data for successively summing the digitized samples of each of said m groups of n digitized samples so as to form said digital representation of the partial response channel response to said input digital data for a data symbol period; and
    means for providing said input digital data to said summing means shifted by one data symbol every m groups, whereby to allow said summing means to form the digital representation of the partial response channel response to said input digital data for successive data symbol periods.

2. The digital partial response filter recited in claim 1 wherein n=16 and m=64.

3. The digital partial response filter recited in claim 1 wherein:
    said means for storing and providing comprises digital memory means having address inputs and outputs output and counting means coupled to the address inputs of said memory means for accessing said digitized samples and causing said memory means to provide said digitized samples at the outputs of said memory means; and
    said summing means comprises two's complement digital adding means and means responsive to said input digital data for forming the two's complement of said digitized samples when said input digital data has a first value and for maintaining said digitized samples unchanged when said input digital data has a second value.

4. The digital partial response filter recited in claim 3 wherein:
    said digitized samples stored in said memory means are stored as positive values having a sign bit for indicating the polarity of each of said digitized samples; and
    said means for forming the two's complement is further responsive to said sign bit, said means for forming the two's complement maintaining said digitized samples unchanged when said sign bit and said input digital data have the same value and forming the two's complement when said sign bit and said input digital data have different values.

5. The digital partial response filter recited in claim 4 wherein said means for forming the two's complement of said digitized samples comprises a plurality of exclusive OR gating means, one of said gating means having a first input coupled to said sign bit, a second input for receiving said input digital data and an output coupled to one input of each of the remaining gating means, the other input of each of said gating means coupled to respective ones of the outputs of said memory means, each said input receiving a respective bit of said digitized samples.

6. The digital partial response filter recited in claim 1, further comprising precoding means receiving said input digital data for substantially eliminating the effect of intersymbol interference, said input digital data being serial digital data, the precoded digital data from said precoding means being coupled to said summing means for controlling said summing means.

7. The digital partial response filter recited in claim 6, wherein said means for providing said input digital data to said summing means comprises means for repetitively providing said input digital data in m blocks of n bits of serial data to said summing means.

8. The digital partial response filter recited in claim 7 wherein said means for repetitively providing comprises memory means for storing an n-bit string of said input digital data and multiplexer means coupled to said memory means for successively providing said n-bit string in serial format.

9. The digital partial response filter recited in claim 1 wherein said means for storing digitized samples of a partial response channel response to a representative input data symbol has stored therein digitized samples of a sine spectrum partial response channel response.

10. The digital partial response filter recited in claim 9 wherein said representative input data symbol is a binary logic 1.

11. The method for forming a digital representation of the partial response channel response to input digital data, said input digital data having a data symbol period, comprising the steps of:
    storing digitized samples of a substantially partial response channel response to a representative input data symbol for n data symbol time periods, each data symbol time period divided into m samples, where n and m are finite numbers and for providing as outputs, in succession, m groups of n digitized samples, said n digitized samples provided as samples of said partial response channel response at n equally divided data symbol time periods, each successive group having the digitized samples shifted by one sample in said data symbol time period;

successively summing, in response to said input digital data, the digitized samples of each of said m groups of n digitized samples so as to form said digital representation of the partial response channel response to said input digital data for a data symbol period; and providing said input digital data shifted by one data symbol every m groups, whereby to form the digital representation of the partial response channel response to said input digital data for successive data symbol periods.

* * * * *

UNITED STATES PATENT AND TRADEMARK OFFICE
CERTIFICATE OF CORRECTION

PATENT NO. : 4,558,454

DATED : Dec. 10, 1985

INVENTOR(S) : Michael T. Hills; Raymond L. Heinrich

It is certified that error appears in the above-identified patent and that said Letters Patent is hereby corrected as shown below:

Col. 4, line 20, change "Consider" to --Counter--.

Col. 5, line 15, change "coupled" to --couples--.

Col. 6, lines 54-55, delete "as disclosed in the above copending application,"

Col. 7, line 61, delete "output".

Signed and Sealed this

Thirteenth Day of May 1986

[SEAL]

Attest:

DONALD J. QUIGG

Attesting Officer

Commissioner of Patents and Trademarks